Nov. 20, 1951     T. L. MAYRATH     2,575,884
POWER TRANSMISSION CONTROL MECHANISM
Original Filed Sept. 15, 1939     4 Sheets-Sheet 1
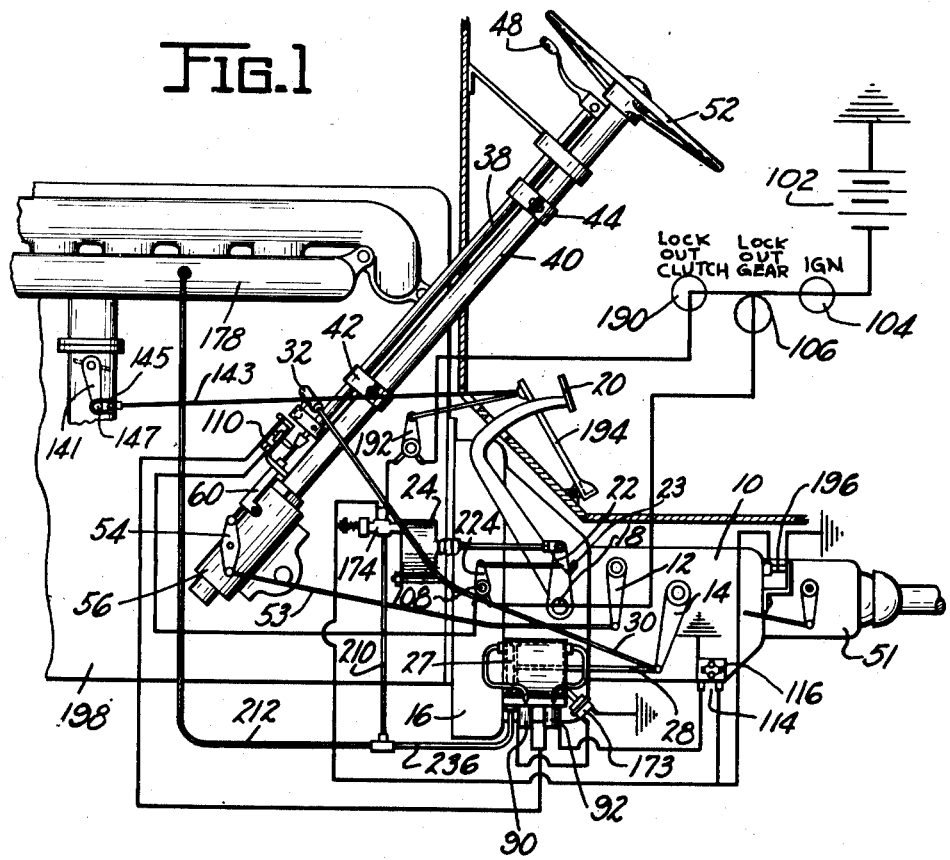
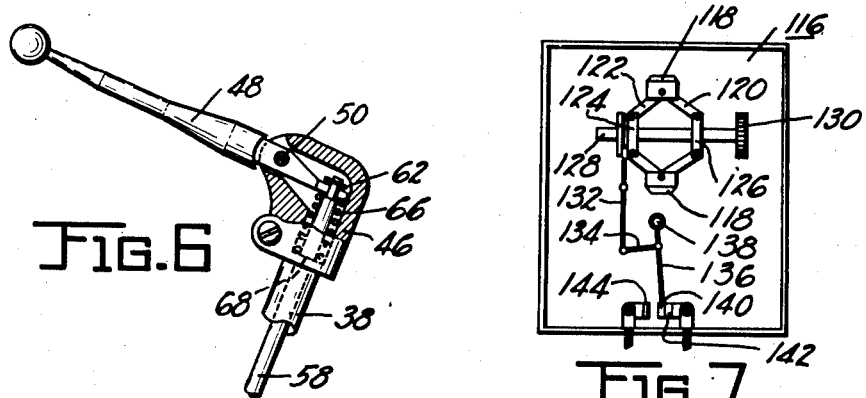
INVENTOR
THOMAS L. MAYRATH
BY
H. O. Clayton
ATTORNEY

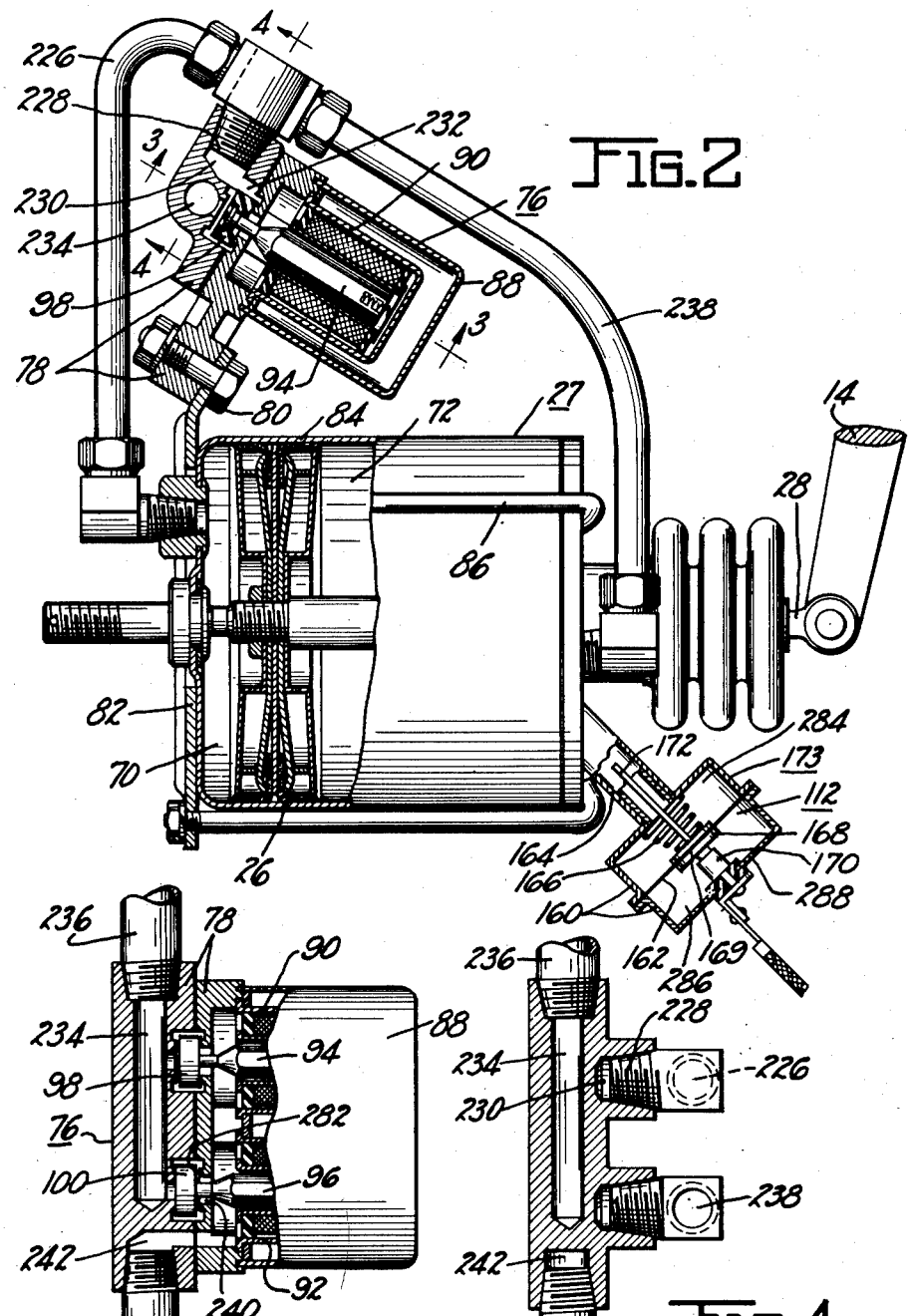

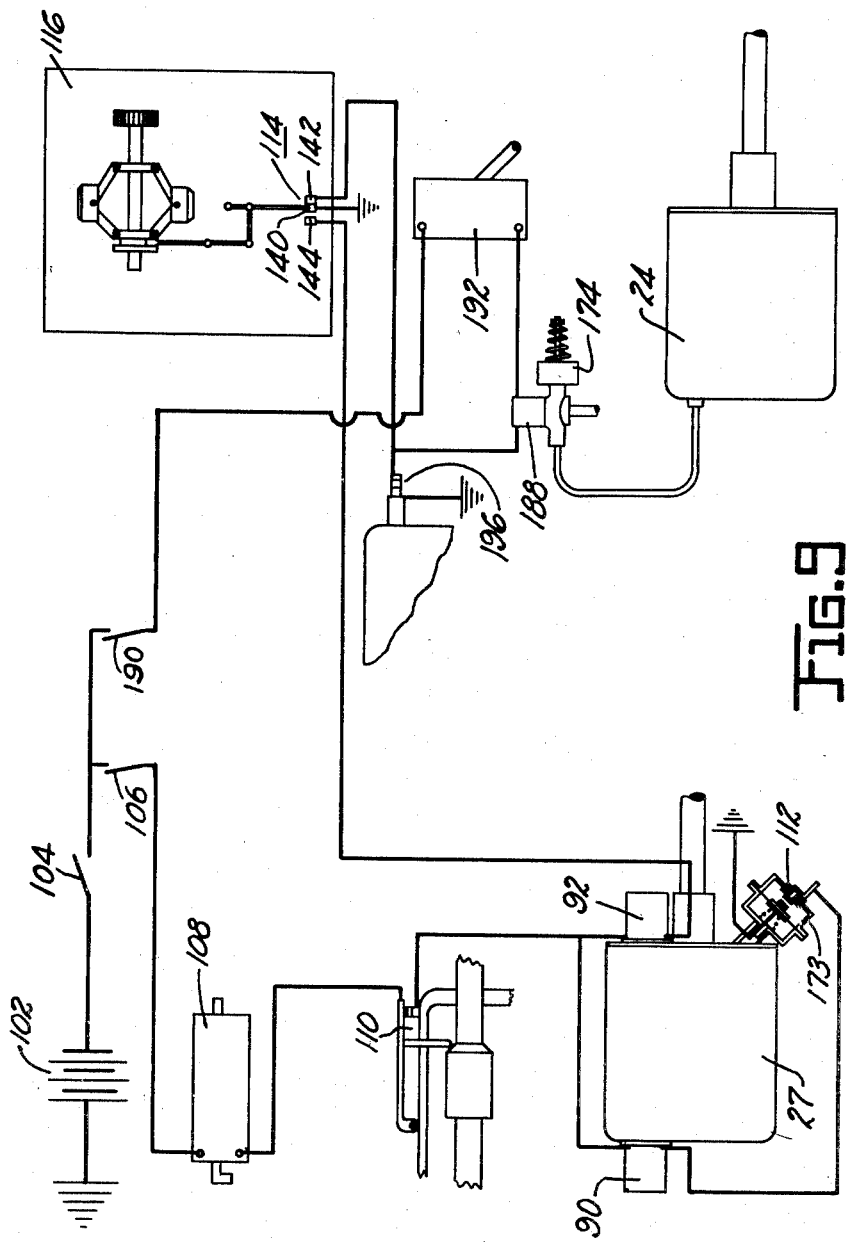

Patented Nov. 20, 1951

2,575,884

UNITED STATES PATENT OFFICE 2,575,884

POWER TRANSMISSION CONTROL MECHANISM

Thomas L. Mayrath, Dayton, Ohio, assignor to Bendix Aviation Corporation, South Bend, Ind., a corporation of Delaware Original application September 15, 1939, Serial No. 295,003, now Patent No. 2,296,289, dated September 22, 1942. Divided and this application November 18, 1941, Serial No. 419,649

15 Claims. (Cl. 192—.092)

This invention relates in general to the power transmission mechanism of an automotive vehicle and in particular to means for operating a friction clutch and a change-speed transmission of a vehicle provided with a fluid clutch.

An object of the invention is to provide manually and power operated means, controlled in part by the accelerator and by a lever or selector member preferably mounted on the steering post immediately beneath the steering wheel, for actuating the friction clutch and the change-speed transmission of an automotive vehicle.

Yet another object of the invention is to provide, in a mechanism for operating the aforementioned transmission, a pressure differential operated motor operably connected to the transmission, said motor being controlled by electromagnetically operated valves, said valves being automatically controlled, in part, by vehicle speed-responsive mechanism, whereby the shifting of gears and accordingly the setting of the transmission is dependent upon the speed of the vehicle.

The invention further contemplates the provision of a power mechanism, controlled in part by the accelerator and in part by a governor, for operating the clutch of an automotive vehicle, said governor also serving, in part, to control power means for operating the change-speed transmission of the vehicle.

Another object of the invention is to provide means for operating the aforementioned transmission, said means being manually operated to place the transmission either in low or in reverse gear and automatically operated, by power means, to place the transmission either in second or in high gear.

A still further object of the invention is to control a transmission operating means by means including the accelerator of the vehicle, a speed responsive governor and a selector, preferably positioned beneath the steering wheel.

Yet another object of the invention is to provide but three members, namely, the accelerator, the clutch pedal and a lever preferably mounted beneath the steering wheel of the vehicle, for controlling the operation of the clutch, the throttle and the transmission of the vehicle, the throttle being operated solely by the physical effort of the driver, the clutch by either the physical effort of the driver or power and the transmission partly by the physical effort of the driver of the vehicle and partly by power, to which power may be added the physical effort of the driver.

The invention further contemplates the provision of power means for operating the friction clutch of an automotive vehicle, said power means being controlled in part by the accelerator of the vehicle, the change-speed transmission of the vehicle and a propeller shaft operated governor, whereby the clutch is automatically disengaged by the power means when the accelerator is released and the transmission is in any setting except high gear, said disengagement being effected when the accelerator is released, and the transmission is in high gear only when the speed of the vehicle is decreased to or below a predetermined factor.

Yet another object of the invention is to provide, in combination with a fluid clutch or oft-called fluid-drive, means for operating a three-speeds forward and reverse transmission positioned between said clutch and the drivewheels of the vehicle, said transmission operating means being operative to automatically place the transmission in second gear when the speed of the vehicle drops to or below a predetermined factor and to automatically place the transmission in high gear when the speed of the vehicle exceeds said factor.

Yet another object of the invention is to provide, in an automotive vehicle, a power transmission for interconnecting the internal-combustion engine and the driving wheels of the vehicle, said transmission including a fluid clutch, a three-speeds forward and reverse change-speed transmission and a spring operated disk plate clutch, the latter being interposed between the fluid clutch and the change-speed transmission, said mechanisms being actuated by cooperating power means and physically operated means, the power means for actuating the transmission being operative to automatically place the transmission either in second gear or in high gear, depending upon the speed of the vehicle, and the power means for actuating the clutch functioning automatically to disengage the clutch when the speed of the vehicle is below a certain factor and the accelerator is at the time released.

One of the most important objects of the invention is to provide, in an automotive vehicle equipped with a fluid clutch, a friction clutch and a manually and power operated selective change-speed transmission, means for controlling the operation of said clutches and transmission including a vehicle speed responsive governor, an accelerator, a clutch pedal and a selector lever; accordingly, the invention comprehends the use of but one automatically operated control means and three manually operated controls for controlling two clutch mechanisms and the transmission.

Another important object of my invention is to provide in an automotive vehicle equipped with an internal combustion engine a fluid clutch, a friction clutch and a selective change-speed transmission, manually and power operated mechanism for operating the transmission and mechanism for controlling the operation of the engine, the clutches and said transmission operating means including a manually operated accelerator, a vehicle speed responsive governor, a manually operated clutch pedal and a manually operated shift lever, the parts of said mechanism being so constructed and arranged that the clutch pedal is manually operated in effecting a setting of the transmission in a relatively low gear ratio setting and is left idle when the mechanism is effecting a power operation of the transmission under the control of the governor and accelerator.

Yet another object of my invention is to provide in an automotive vehicle equipped with an internal combustion engine an accelerator, a vehicle speed responsive governor, a fluid clutch, a friction clutch, a clutch pedal, a selective change-speed transmission and a transmission controlling and operating selector lever means for operating the clutches and transmission including transmission operating power means controlled by the accelerator, the selector lever and the governor and power means, cooperating with the clutch pedal, for operating the friction clutch, said latter means being also controlled by the accelerator and governor. Yet another object of my invention is to so construct and arrange the parts of this mechanism that the friction clutch operating power means may be cut out of operation, whereby said clutch is then manually operated by the clutch pedal.

Yet another object of my invention is to provide, in an automotive vehicle equipped with an internal combustion engine, an accelerator, a fluid clutch, a friction clutch, a clutch pedal, a selective change-speed transmission, a vehicle speed responsive governor and a transmission controlling selector lever, means for operating and controlling the operation of said clutches and transmission including means for establishing the transmission in one of its gear ratio settings by the physical effort of the driver when the selector lever is manually moved to a certain position and for preparing the transmission for a power operation when said lever is moved to another position, the power operation being controlled by an operation of the accelerator and governor.

Other objects of the invention and desirable details of construction and combinations of parts will become apparent from the following description of a preferred embodiment, which description is taken in conjunction with the accompanying drawings, in which:

Figure 1 is a diagrammatic view of the clutch and transmission operating mechanism constituting my invention the hand operated selector beneath the steering whel being moved 90° out of position to make possible a disclosure of said selector;

Figure 2 is a view, largely in section, disclosing in detail the transmission operating motor and its control valve mechanism;

Figure 5:
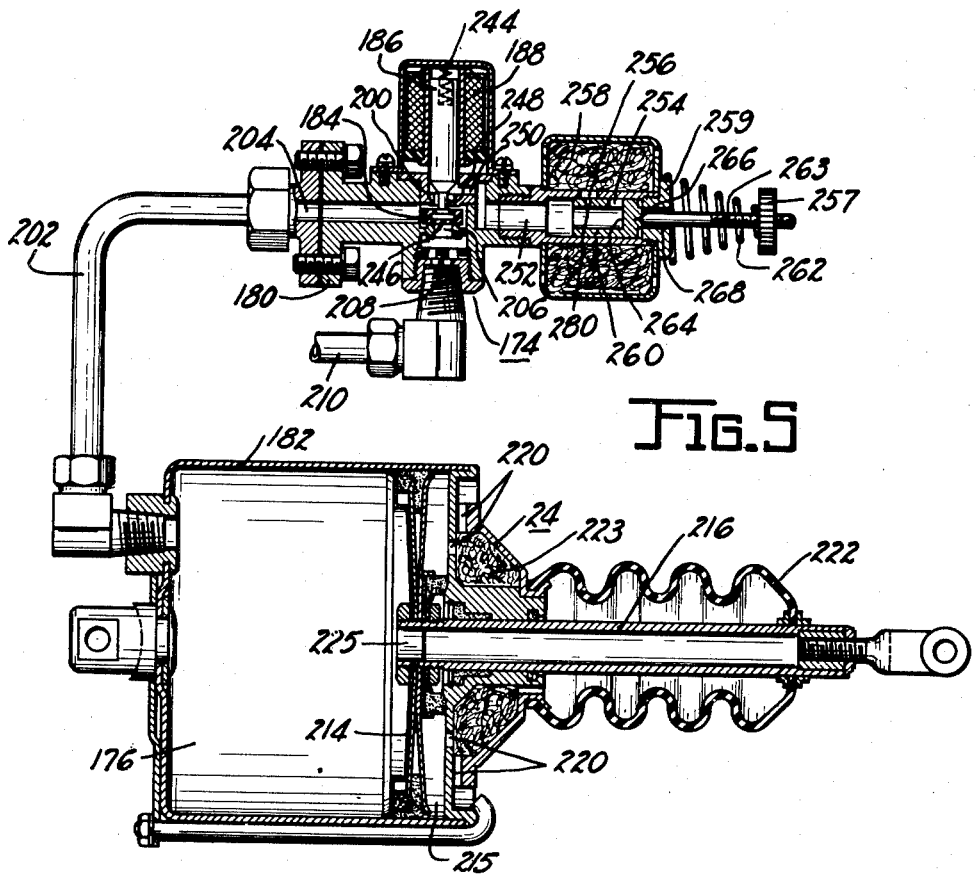
Figure 8:
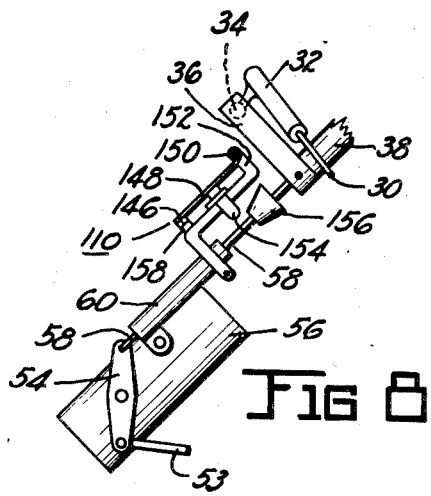

Figures 3 and 4 are views, taken on the lines 3—3 and 4—4 of Figure 2 respectively, disclosing details of part of the valve mechanism for controlling the transmission operating motor of my invention;

Figure 5 is a sectional view of the clutch operating motor and its control valve mechanism;

Figure 6 is a view, partly in section, of the transmission controlling selector lever preferably secured to the steering post beneath the steering wheel;

Figure 7 is an enlarged view of the propeller shaft operated governor and the switch operated thereby, said governor serving to control both the clutch and the transmission operating power means;

Figure 8 is a view disclosing in detail the cross-shift lock-out switch of my invention; and Figure 9 is another diagrammatic view of my invention disclosing, in particular, the electrical hook-up.

Referring now to Figure 1, disclosing a preferred embodiment of my invention, a three-speeds forward and reverse transmission 10 is operated by means of cranks 12 and 14, the crank 12 serving to operate the shift rail selecting mechanism of the transmission and the crank 14 serving to operate that part of the transmission functioning to move the selected rail to establish the transmission in the desired gear ratio. The transmission is of a conventional type, including a second and high gear shift rail and a low and reverse gear shift rail. Such a transmission, that is, one provided with two shift rails, a crank for operating the rail selecting mechanism and another crank for actuating the shift rail operating mechanism, is now used on the 1939 Cadillac automobile and one example of this type of transmission is disclosed in Price Patent No. 2,152,914, dated April 4, 1939. No claim is made to this transmission; accordingly, no need is seen for disclosing it in detail. Furthermore, it will be obvious that other well-known step-type change-speed transmissions, employing the aforementioned two cranks and two shift rails, might be operated by the mechanism of my invention.

My invention has to do with the manually and power operated mechanism for actuating the cranks 12 and 14, which mechanism is to a degree interlocked with manually or power operated mechanism for operating a conventional friction clutch having driving and driven plates forced into engagement by clutch springs.

An important feature of my invention lies in the combination of a fluid clutch or oft-called fluid coupling 16, the aforementioned friction or oft-called disk plate clutch, and the interlocked transmission and disk plate clutch operating mechanism. The disk plate clutch is operably connected to a clutch throw-out shaft 18, to which is connected a foot operated clutch pedal 20 and a crank 22 actuated by a vacuum motor 24. The clutch pedal 20 is preferably rotatably mounted on the shaft 18 and is connected to said shaft by a lost motion connection including a bent pin 23 fixedly secured at one of its ends to the pedal 20 and contactible at its other end with the crank 22. With this mechanism the clutch pedal remains stationary when the clutch is disengaged by the clutch operating power means, the shaft 18, however, being rotated to disengage the clutch when the pedal is depressed.

Describing now in detail the transmission operating mechanism of my invention, a piston 26 of a double-ended double-acting vacuum operated motor 27, disclosed in Figure 2, is connected to the shift rail operating crank 14 by a rod 28. The crank 14 may also be rotated by manually operated means including a rod 30 having an enlarged end member 32, as disclosed in Figures 1 and 8. To the end of the member 32 there is secured a spherically-shaped member 34, fitting within a recess in the end of a crank 36 secured to the end of a tube 38, the latter being secured to the steering post 40 of the vehicle by brackets 42 and 44. As disclosed in Figures 1 and 6, a hollow housing member 46 is secured to the end of the tube 38 and a selector lever 48 is pivotally mounted at 50 to said member. Rotation of the selector 48, in a plane parallel to the steering wheel 52 of the vehicle, serves to rotate the tube 38 connected thereto which, in turn, through the intermediary of the crank 36 and its universal connection with the member 32, places the rod 30 either in tension or in compression to rotate the shift rail operating crank 14. This mechanism for manually operating the crank 14 constitutes an important feature of my invention, for with such a mechanism said crank may be operated manually in the event of failure of the power means. Furthermore, as will be made evident hereinafter, this mechanism provides the sole means for placing the transmission either in low gear or in reverse gear.

The crank 12, which operates the shift rail selecting mechanism, is rotated by the manually operated mechanism disclosed in Figures 1, 6 and 8. This mechanism includes a rod 53, preferably connected to a lever 54 pivotally mounted on a support 56 for the steering post. To one end of the lever 54 there is pivotally connected a rod 58, which extends through a housing member 60, also secured to the support 56. From the member 60 the rod 58 extends through the tube 38 and is provided, at its upper end, with a pin 62. One end of the selector 48 is provided with an opening, and the selector is, as disclosed in Figure 6, sleeved over the pin 62. A spring 66, surrounding the rod 58 and interposed between a seat 68 in the housing member 46 and the end of the selector, serves to move or bias the rod upwardly and thereby maintain the crank 12 in position to effect a second or high gear operation of the transmission; that is, unless the driver of the vehicle rotates the selector upwardly or counterclockwise, in a plane perpendicular to the plane of the steering wheel, the compressed spring 66 serves to maintain the selector in position preparatory to placing the transmission either in second or in high gear by the power means described in detail hereinafter. The manual operation of the transmission to establish the same in either reverse gear or low gear is accomplished by rotating the selector in a plane parallel to the plane of the steering wheel. There are thus three operative positions in which the selector is most often placed with the mechanism of my invention. One of these positions is described above wherein the selector is biased by the spring 66 to a position preparatory to effecting a power operation of the transmission. This may be termed the automatic or power position of the selector; and the two other positions in which the transmission is most often placed are its low gear and reverse gear positions. Of course, the selector may also be placed in a transmission neutral position and should all of the power means fail the selector may be manually moved to establish the transmission in either second gear or high gear.

Describing now the valvular mechanism for controlling the operation of the transmission operating motor 27, the piston or power element 26 of the motor divides the same into two compartments 70 and 72. The gaseous pressure within these compartments determines the differential of pressures acting upon the piston to move it to rotate the crank 14 clockwise or counterclockwise, and thus establish the transmission in gear. This gaseous pressure is controlled by a valvular unit 76, disclosed in detail in Figures 2, 3 and 4, said unit including a two-part body member 78, clamped by bolts 80 to a bracket 82 secured to the casing 84 of the motor 27 by rods 86. To the body member 78 of the valve unit there is secured a housing 88 within which are secured solenoids 90 and 92. To the armatures 94 and 96 of said solenoids there are secured valve members 98 and 100 respectively.

Describing now the electrical circuits and switches for controlling the operation of the solenoid 90, the connection between a grounded battery 102 and the ground to complete the circuit includes an ignition switch 104, a dash-mounted lock-out or cut-out switch 106, a clutch or manually operated breaker switch 108, a cross-shift lock-out switch 110, solenoid 90 and a power operated switch 112. These switches are, as disclosed in Figure 9, connected in series. As to the solenoid 92, which is in parallel with the solenoid 90, the circuit includes the aforementioned switches 104, 106, 108 and 110, the solenoid 92 and a two-pole switch 114 operated by a propeller shaft operated fly-ball governor 116 of any well-known design.

Such a governor is disclosed in Figure 7, wherein the fly-balls 118 are, through the intermediary of links 120 and 122 and collars 124 and 126, actuated by a shaft 128, to which shaft there is secured a gear 130 meshed with a gear, not shown, driven by the propeller shaft of the vehicle or means connected thereto. The collar 124 is provided with a groove receiving one end of a lever 132 pivotally connected to a link 134, which is pivotally connected to a lever 136 fulcrumed at 138. The end of the lever 136 constitutes a contact member 140 alternately movable into contact with either contact 142 or contact 144, depending of course upon the speed of the vehicle. When the vehicle is moving at, say, five M. P. H. or less, lever 136 is moved so as to bring contacts 140 and 142 into engagement; whereas, when the vehicle is moving at, say, fifteen M. P. H. or at a higher speed, said lever is moved so as to bring contacts 140 and 144 into engagement. The governor and its connections, to which no claim is made, may of course be adjustable to effect the desired operation of the switch.

Describing now in detail the cross-shift switch 110, which is disclosed in detail in Figure 8, the same comprises a contact 146 mounted on one end of a lever 148 pivoted at 150 to a bracket 152. The bracket is secured to the housing member 60 and is provided with an opening to receive a pin 154 secured to the lever 148. The end of said pin is rounded to cooperate with a cone 156 fixedly secured to the rod 58. When the selector 48 is rotated counterclockwise, in a plane perpendicular to the plane of the steering wheel, the rod 58 and its connected cone 156 are moved downwardly, thus forcing the cone into contact with the pin 154 to move the latter outwardly. This operation serves to rotate the lever 148 about its fulcrum to thus move the contact 146 out of engagement with a contact 158 and break the circuit to the solenoid 90.

The power operated switch 112, disclosed in detail in Figure 2, includes a two-part housing 160. Between the parts of the housing there is secured a diaphragm 162, and the housing is secured by a tube 164 to the casing 84 of the motor 27. A spring 166 serves to urge a contact 168, secured to a metallic plate 169 fixed to the diaphragm 162, into contact with a contact 170, which is wired to solenoid 90. A pin 172, secured to the diaphragm 162, and part of contact 168, is wired to the chassis of the vehicle to effect a ground connection. The housing 160 and the diaphragm 162 together constitute a pressure differential operated motor 173 for operating, together with the spring 166, the switch 112: accordingly, the switch may be said to be power operated.

The cut-out or oft-called lock-out switch 106 and the clutch operated switch 108 are not disclosed in detail, inasmuch as they are merely breaker switches of conventional design.

Describing now the power means, Figure 5, for operating the disk plate clutch, a three-way valve unit 174 serves either to connect a compartment 176 of the motor 24 to the atmosphere to deenergize the motor and thereby permit the clutch springs to maintain the clutch engaged or to connect said compartment to a source of vacuum, preferably the intake manifold 178, to partially evacuate the compartment and thus energize the motor to effect a disengagement of the clutch. As disclosed in Figure 1 and as diagrammatically disclosed in Figure 5, the three-way valve, which will be described in greater detail hereinafter, includes a casing 180 secured to the casing 182 of the motor 24, said casing 180 housing a valve member 184 secured to the end of an armature 186 constituting the movable part or power element of a solenoid 188. The solenoid is energized to move the armature upwardly by closing an electrical circuit including, in series, the ignition switch 104, a cut-out or breaker switch 190, preferably mounted on the dashboard of the vehicle, a breaker switch 192 operated by the accelerator 194 of the vehicle, the solenoid 188 and a breaker switch 196 operated by the second and high gear shift rail to open or break the switch when and only when the transmission is in high gear. At all other times the switch 196 is closed, that is, when the transmission is in reverse gear, second gear, low gear or neutral. These breaker switches are not disclosed in detail, inasmuch as no claim is made thereto: furthermore, they are well known to those skilled in this art.

It may be stressed here that the governor operated switch 114, disclosed in detail in Figure 7, constitutes one of the important features of my invention; for with this mechanism there is provided an interlock between the clutch and transmission operating mechanisms. As to the interrelation of the switches 114 and 196, when the contacts 140 and 142 are engaged, that is, when the speed of the vehicle is equal to or less than five M. P. H., a ground connection is made, irrespective of whether or not the switch 196 is open or closed. This interlock feature will be referred to hereinafter.

Describing now the complete operation of the transmission and clutch operating mechanism constituting my invention, and incidentally completing the detailed description thereof, we will assume the dash-mounted switches 104, 106 and 190 to be closed and the internal-combustion engine 198 to be idling, thereby creating a partial vacuum in the intake manifold 178 of the internal-combustion engine. The accelerator 194 is at the time released, thereby closing the breaker switch 192. Furthermore, the cross-shift switch 110 is closed, inasmuch as the selector 48 is at the time biased by the spring 66 to its second and high gear cross-shift position. Incidentally, the selector is, in Figure 1, shown 90° out of position for the purpose of more clearly disclosing the invention. The switch 196 is at the time closed, inasmuch as the transmission is not in high gear. The power operated switch 112 is at the time closed by power means, that is, the spring 166, and the contacts 140 and 142 of the switch 114 are in engagement, inasmuch as the vehicle is at a standstill.

Continuing the description of the operation of the mechanism and assuming the parts of the same to be in the positions set forth above, the solenoid 188 of the clutch operating mechanism will be energized, thus moving the valve member 184 upwardly to seat said member upon a valve seat 200. The compartment 176 of the clutch operating motor 24 will then be partially evacuated, for there is provided a fluid transmitting connection between the said compartment and the intake manifold via a conduit 202, a duct 204 in the valve casing 180, ports 206 and 208 in said casing and conduits 210 and 212 leading to the intake manifold 178. The piston 214 of the clutch motor 24 is thus subjected to a differential of pressures, for a compartment 215 of the motor is at the time subjected to atmospheric pressure via openings 220 in the end plate structure of the cylinder 182. The air passing through said openings is filtered by suitable means such as steel wool 222 or its equivalent. A plug 225 is inserted in the inner end of the rod 216 to prevent the withdrawal of air from the interior of said rod. The piston 214 is accordingly moved to the left to effect a disengagement of the clutch, and when the clutch is disengaged a crank 224, Figure 1, is moved sufficiently to close the switch 108.

The closing of the switch 108 closes the circuit including the solenoid 90: accordingly, the latter is energized. The armature 94 is thus moved to the position disclosed in Figures 2 and 3, opening the valve 98 and interconnecting the compartment 70 of the transmission operating motor 27 with the intake manifold via a conduit 226, port 228 in the valve body member, a duct 230, a port 232 and a duct 234 in said member, and a conduit 236 leading to the conduit 212, which leads to the intake manifold. The compartment 70 being connected to the intake manifold is immediately partially evacuated and the piston 26 is moved to the left, to the position disclosed in Figures 1 and 2, to thereby rotate the crank 14 and place the transmission in second gear, that is effect what may be termed a downshift operation of the transmission. The piston 26 moves to the left, Figure 2, for it is then subjected to a differential of pressures, compartment 72 of the motor 27 being at the time vented to the atmosphere via a conduit 238 and ports 240 and 242, Figure 3.

After the transmission is established in second gear, the accelerator is then depressed to speed up the engine and engage the clutch. Describing the clutch engaging operation of the motor 24, when the accelerator is depressed, the switch 192 is opened, thereby deenergizing the solenoid 188, permitting a spring 244 to move the armature 186 and its connected valve member 184 downwardly, the latter member seating upon a valve seat 246. The compartment 176 of the motor 24 is then vented to the atmosphere via conduit 202, duct 204, a port 248, ducts 250 and 252, ports 254 and 256 and the air cleaner 258. The ports 254 and 256 register to effect this result, for when the clutch springs begin to move the driving clutch plate toward its clutch engaged position in contact with the driven plate of the clutch, that is, when the piston begins its movement to the right, Figure 5, there is created by the action of the springs a partial vacuum in the compartment 176 and the aforementioned fluid transmitting connections interconnecting said compartment with the duct 252. A reciprocable tubular valve member 260, biased to the position disclosed in Figure 5 by a spring 262, is moved to the left, Figure 5, to effect the aforementioned registering of ports 254 and 256. The spring 262 is sleeved over a stem 263, secured to and extending from one end of said valve member, and is interposed between a nut 257, threadedly mounted on the stem 263, and a plug 259. This movement of the valve member 260 to the left is effected, inasmuch as said member is at the time subjected to a differential of pressures overcoming the effect of the spring 262; for the duct 252 is partially evacuated, thus subjecting the inner face 264 of the valve member to the rarefied air, and the right-outer face 266 of the valve member is vented to the atmosphere via an opening 268 in the plug 259. When the clutch plates contact, the movement of the driving clutch plate is appreciably slowed down, immediately resulting in an appreciable increase of the gaseous pressure within the compartment 176. The spring 262 then moves the valve member 260 to the right to the position disclosed in Figure 5, a relatively small port 280 in the valve member coming into registry with the port 256. A relatively slow bleed of air into the compartment 176 is then initiated. There is thus effected two distinct stages of movement of the driving clutch plate as it moves into complete engagement with the driven clutch plate, the first stage being relatively fast by virtue of the rapid inrush of air into the compartment 176 and the second stage being relatively slow by virtue of the relatively slow bleed of air into said compartment via the registered ports 280 and 256. The time of operation of the valve member 260 may be regulated by an adjustment of the nut 257, which determines the load exerted by the spring upon the valve. The fluid coupling 16 cooperates with the friction clutch operating two-stage motor 24 for said fluid coupling cushions the shock when the driving clutch plate of the friction clutch contacts the driven plate of said clutch; furthermore, the fluid clutch cooperates with the clutch control motor to effect the desired smooth engagement of the friction clutch, that is the desired acceleration of the vehicle during the aforementioned second stage clutch engaging operation of said motor.

The clutch being engaged, the accelerator is depressed to speed up the engine to effect the desired speed of the vehicle. When this speed equals, say, fifteen M. P. H. or the top setting of the governor 116, whatever, it may be, the contacts 140 and 144 engage each other, making possible a high gear operation of the transmission.

Should the driver desire to effect an up-shift operation of the transmission, that is a shift of the transmission into high gear, he merely has to release the accelerator, for a release of the accelerator results in a closing of the switch 192, and since the transmission is then in second gear the switch 196 is closed. The circuit to the solenoid 188 is accordingly closed and the three-way valve 174 again operated to open the valve. The motor 24 is accordingly again energized, the friction clutch is disengaged and the switch 108 is again closed.

Describing now an important feature of my invention, when the switch 108 is closed and the contacts 140 and 144 of the switch 114 engaged, the circuit including the solenoid 92 is completed, resulting in an energization of said solenoid. The armature 96 of the solenoid 92 is thus moved to the right, Figure 3, to seat the valve member 100 upon a seat 282 and connect the compartment 72 of the motor 27 with the intake manifold. As soon as the evacuation of the compartment 72 is initiated, a compartment 284 of the switch operating motor 172 is also evacuated, for the compartment 72 and 284 are interconnected by the tube 164. The diaphragm 162 is then subjected to a differential of pressures, for a compartment 286 of the motor is vented to the atmosphere via an opening 288 in the housing 160. The diaphragm 162 is thus moved upwardly, Figure 2, to open the switch 112 and deenergize the solenoid 90. The compartment 70 of the motor 27 is thus vented to the atmosphere and there results a movement of the piston 26 to the right to effect a clockwise rotation of the crank 14 to place the transmission in high gear.

The transmission having been established in high gear, the accelerator is again depressed to effect a clutch engaging operation of the motor 24 and an opening of the throttle to speed up the vehicle. Assuming the vehicle to be traveling at or above fifteen M. P. H. to maintain the contact 140 away from contact 142, subsequent release of the accelerator will not effect a clutch disengaging operation of the motor 24, for it will be remembered that when the transmission is in high gear the second and high gear shift rail functions to open the switch 196. Both the solenoid 188 and the motor 24 are accordingly deenergized and the clutch remains engaged. However, should the speed of the vehicle be reduced to five M. P. H. or less, and the transmission remain in high gear, the circuit necessary to energize the solenoid 188 will be completed and the clutch will be automatically disengaged.

There is thus provided manually and power operated means for operating both the friction clutch and the change-speed transmission of the automombile, such means cooperating with the fluid clutch 16, which is placed ahead of the friction clutch in the power transmitting connection between the internal-combustion engine and the drivewheels of the vehicle. With the clutch and transmission operating mechanism of my invention, the friction clutch is automatically disengaged and the transmission is automatically placed in second gear, that is shifted down when the vehicle is stopped and the accelerator is released. Upon depressing the accelerator, the friction clutch is engaged and the vehicle is placed in motion, the torque being transmitted through the fluid clutch 16; and as previously described the two-stage engagement of the friction clutch by means of the motor 24 cooperates with the fluid coupling in effecting both a smooth start of the vehicle from rest and a smooth coupling of the internal-combustion engine with the transmission when the vehicle is in motion and after the transmission has been operated to shift gears; and the fluid coupling cooperates with the transmission operating power means of my invention, for because of the so-called yielding operation of said coupling, described hereinafter, the car may be started from rest with the transmission established in a relatively high gear ratio setting.

If the friction clutch operating power means of my invention is either by accident or design rendered inoperative, then said clutch should be manually disengaged to facilitate the manual operation of the transmission in placing the same in either its low gear or its reverse gear setting, for if this is not done there would be difficulty in demeshing and meshing the gears of the transmission due to the operation of the fluid coupling. It is to be noted that when the friction clutch is manually engaged the fluid coupling cooperates with said clutch in effecting either a smooth start of the vehicle, that is a relatively low acceleration, or a smooth re-coupling of the engine with the propeller shaft of the vehicle after an operation of the transmission. After the vehicle is under way there is then no need to disengage the friction clutch to effect a smooth low gear to second gear or second gear to high gear up-shift operation of the transmission by the motor 27, for when the accelerator is released to idle the engine the torque of the latter is reversed, that is, the engine is then no longer acting as a prime mover or source of power to drive the car.

This smooth up-shift operation of the transmission is then made possible by virtue of the reversal of the engine torque and the operation of the fluid coupling and a free-wheeling unit 51 referred to hereinafter. Explaining the operation of the latter mechanisms during this up-shift operation of the transmission the fluid coupling by virtue of the fluid therein acts as a yieldable member and the free-wheeling unit serves to unload the gears of the transmission from the then rotating propeller shaft of the vehicle. It follows, therefore, that despite the existing connection between the engine and the transmission as a result of the engagement of the friction clutch, the gears of the transmission may be easily demeshed and remeshed. It is also to be noted that if, for any reason, the free-wheeling unit 51 fails to operate, the fluid coupling would of itself yield sufficiently, when the accelerator is released to idle the engine, to make possible the aforementioned smooth up-shift operation of the transmission.

Assuming that the clutch operating motor 24 is inoperative to disengage the clutch and that the vehicle is under way in its low gear setting then if the speed of the vehicle is sufficiently low to operate the governor operated switch 114 by closing the contacts 140 and 142 the motor 27 will upon release of the accelerator be energized to establish the transmission in its second gear setting. It is necessary, of course, that the switch 108 be closed to make this operation possible; however, this is easily done, prior to starting the car from rest and when the motor 24 is inoperative by disconnecting the crank 22 from the crank 224 and then rotating the latter to close the switch 108. It is also necessary, to effect this change from low gear to second gear, to move the selector lever 48 from its low gear to its automatic position thereby closing the switch 110 to make possible a power operation of the transmission. A manual disengagement of the friction clutch is not necessary to effect this second gear operation of the motor 27, for when the engine torque is reversed by releasing the accelerator the fluid coupling 16 acts as a yieldable member in the force transmitting means interconnecting the engine and transmission, and because of this yielding action, which may be explained by the fact that at this time the impeller of the fluid coupling is churning the fluid and moving relative to the rotor of the coupling, very little resistance is encountered to hinder the demeshing operation and the meshing of a new set of gears to establish the transmission in its second gear setting, and it is to be remembered that upon releasing the accelerator in the intake manifold is partially evacuated, thereby creating a source of vacuum which makes possible the energization of the motor 27. To establish the transmission in high gear, that is effect an up-shift operation thereof, the car is speeded up sufficiently to close the contacts 140 and 144 and the accelerator is released to reverse the engine torque and effect the necessary vacuum within the intake manifold to again energize the motor 27.

It is to be particularly noted that with the mechanism of my invention, there is provided a transmission operating mechanism which is controlled in large measure by the clutch pedal 20, the selector 48, the fluid coupling 16, the accelerator 194 and the vehicle speed responsive governor 114, for the accelerator controls the engine torque and the switch 192 and by closing the butterfly valve of the carburetor controls the source of vacuum. The selector is manually operated to place the transmission in low gear or reverse gear and is movable to a certain position to prepare the power operation of the transmission, the clutch pedal is used irrespective of whether or not the clutch operating power means is operative, the fluid coupling is operative to facilitate an operation of the transmission when the same is being established in either second gear or high gear and cooperates with the friction clutch to effect a smooth coupling of the engine and transmission and the governor operated switch is so electrically connected to the valve actuating electromagnetic means of the motor 27 that the governor with the cooperation of the accelerator control the operation of the said motor. And as heretofore described it is also to be particularly noted that it is not necessary for the clutch control motor 24 to function to make possible an operation of the transmission operating motor 27, for with the switch 108 closed said motor is completely controlled by the electrical means, the accelerator and the governor. With the clutch control mechanism in operation the accelerator and governor together with the clutch pedal, selector and fluid coupling constitute the principal controls for effectively operating the transmission. Here again, however, the transmission operating motor 27 is completely controlled by the electrical means, the accelerator and the governor. It is again stressed that when the clutch control is inoperative and the switch 108 is closed preferably by an operation of the personally operated clutch pedal 20, then a manual operation of the friction clutch in conjunction with the manual operation of the transmission and the operation of the fluid coupling effects a smooth start of the vehicle from rest, and thereafter the clutch pedal is personally operated to disengage the clutch and to close the switch 108 to make possible the power operation of the transmission.

As to the need for a clutch pedal when the clutch control mechanism is operative the clutch should be disengaged by the operation of said pedal prior to cranking the engine, for until the engine is cranked the intake manifold is not evacuated; accordingly, the friction clutch is then engaged and if perchance the transmission is not in neutral then upon cranking the engine with the transmission in gear and the friction clutch engaged the car would move, or at least tend to move despite the yielding action of the fluid coupling. The clutch pedal is also needed to manually disengage the clutch when the transmission is in high gear above the clutch control governor speed, that is, when the contacts 140 and 142 are not in engagement with each other.

As to the cooperation between the transmission operator of my invention and the fluid clutch, it is, of course, preferable to place the transmission in second gear rather than in high gear prior to starting the vehicle. With the mechanism heretofore described, this is automatically accomplished. Furthermore, it is particularly desirable, with the use of a fluid clutch, to place the transmission in high gear after the vehicle has been brought up to the desired speed, and my transmission operator automatically accomplishes this setting of the transmission by merely releasing the accelerator. The power operation of the transmission and friction clutch may be completely eliminated however by opening the dash-mounted cut-out switches 106 and 190. The operation of the vehicle is then limited to the manual operation of the accelerator, the selector 48, the clutch pedal and the brake pedal, the latter being applied to decelerate the vehicle and also being applied if the vehicle tends to creep after it is brought to a stop; and with the transmission and clutch operating power means completely inoperative there is no need for a manual disengagement of the friction clutch preliminary to effecting the manual operation of the transmission in shifting from second gear to high gear or from high gear to second gear, for the operation of the fluid coupling together with the reversal of the engine torque by the release of the accelerator makes possible this operation of the transmission without disengaging the friction clutch. If desired the vehicle may be provided with the aforementioned free-wheeling unit which may be cut out of operation by mechanism including a crank 51 actuated by manually actuated linkage extending to the driver's compartment. Accordingly, when the driver wishes to render this free-wheeling mechanism operative, that is to provide a uni-directional drive, he rotates the crank 51 to its operative position. When the driver wishes to disable the free-wheeling mechanism, that is positively connect the driving shaft of the transmission with the propeller shaft of the vehicle, he moves the crank 51 back to its inoperative position. This free-wheeling mechanism which is usually an overrunning clutch, cooperates with the fluid clutch and/or the friction clutch in facilitating the operation of the transmission, for when the friction clutch is disengaged and the vehicle is in motion the transmission is isolated. Substantially the same effect results if the friction clutch is not disengaged, for the slipping fluid clutch transmits very little power when the engine is idling.

Discussing the cooperation between the power means for operating the clutch and the power means for operating the transmission, the governor 116 and the switch 114 operated thereby constitute parts common to both power means, said parts cooperating with the shift rail operated switch 196 and with the switch 112, which in part controls the shifter motor 27.

In brief, the cooperating change-speed transmission, the transmission and clutch operating means and the two clutches constituting my invention provide a very simple and compact mechanism for transmitting driving power from the internal-combustion engine to the rear wheels of the vehicle.

This application is a division of my application, Serial No. 295,003, filed September 15, 1939, together with a description of the operation of the mechanism disclosed in said application when the friction clutch operating power means is inoperative and the switch 108 is closed. This application matured into the Patent No. 2,296,289, dated September 22, 1942.

While one illustrative embodiment has been described, it is not my intention to limit the scope of the invention to that particular embodiment, or otherwise than by the terms of the appended claims.

I claim:

1. In an automotive vehicle provided with an accelerator, a friction clutch and a change-speed transmission, means for operating the clutch and transmission including a pressure differential operated motor operably connected to the clutch, means for controlling the operation of said motor including an accelerator operated switch and a governor operable in accordance with the speed of the vehicle, pressure differential operated means for operating the transmission to establish the same in one or another of a plurality of gear ratios, and means for controlling the operation of said latter motor including said governor, a plurality of electromagnetically operated valves, and a switch operated by said first-mentioned motor.

2. In an automotive vehicle provided with an accelerator, the combination with a fluid clutch, a friction clutch and a change-speed transmission positioned, in the order named, in the power transmission mechanism interconnecting the internal-combustion engine and the driving wheels of the vehicle, of power means controlled in part by the accelerator for disengaging the clutch when the accelerator is released and the speed of the vehicle is decreased to or below a predetermined factor, power means automatically operative to place the transmission either in second or in high gear depending upon the speed of the vehicle, and vehicle speed-responsive means for in part controlling the operation of both of said power means whereby when the vehicle is stopped the clutch is disengaged and the transmission is placed in second gear.

3. In an automotive vehicle provided with an internal-combustion engine, a carburetor and a propeller shaft, means for transmitting power from the engine to said shaft including a fluid clutch, a change-speed transmission and a friction clutch positioned between said transmission and fluid clutch, and means for effecting an operation of the engine, the transmission and both of the aforementioned clutches, said latter means including power means for operating the transmission to establish the same either in second gear or in high gear, power means for disengaging the friction clutch when the vehicle is brought to a stop, and means for controlling the operation of both of said power means including an accelerator and speed-responsive means, and further including a manually operated selector mounted within reach of the driver of the vehicle.

4. Power transmission mechanism for an automotive vehicle provided with an internal-combustion engine and a propeller shaft including, in combination, a fluid clutch, a change-speed transmission having two shift rails and a friction clutch interposed between said fluid clutch and the transmission, together with means for effecting an operation of said power transmission mechanism including power means for operating the friction clutch, power means for operating the transmission, and means for controlling the operation of both of said power means including the accelerator which in part controls the operation of both of said clutches and the engine, an accelerator operated breaker switch for controlling the clutch operating power means, a power operated switch for in part controlling the operation of said transmission operating power means, a switch operated by a propeller shaft operated governor, the latter switch serving in part to control the operation of both of said power means, and a breaker switch opened by the second and high gear shift rail of the transmission when said rail is in position to establish the transmission in high gear.

5. In an automotive vehicle provided with an internal-combustion engine, a carburetor, a power and manually operated change-speed transmission, a manually operated transmission controlling selector lever, a propeller shaft operated governor, a friction clutch operated at times by power and a fluid clutch interposed between the friction clutch and the engine and operative, in cooperation with the friction clutch when the latter is being engaged after being disengaged by power, to effect the desired acceleration of the vehicle from rest and also operative to effect the desired acceleration of the vehicle when the friction clutch is engaged and is not operable by power, means for operating and controlling the operation of said clutches, transmission and carburetor including an accelerator, a pressure differential operated motor for operating the change speed transmission and a pressure differential operated motor for at times operating the friction clutch, valve means for controlling the operation of said motors, means for controlling the operation of said valve means including a plurality of solenoids, means for controlling the operation of one of said solenoids for the valve means controlling the clutch motor including a switch so connected with said governor that the switch is closed when the speed of the vehicle is at or below a predetermined factor and an accelerator operated switch which is closed when the accelerator is released to idle the engine, and means for controlling the operation of the solenoids for the transmission motor aforesaid comprising a circuit including a third switch, said third switch being adapted to close upon the aforesaid disengagement of the clutch by the clutch motor, such closure being then effective to energize one of said plurality of solenoids to operate the gear shift motor.

6. In an automotive vehicle provided with a power plant including an accelerator, a change-speed transmission capable of being established in any one of a plurality of forward gear settings or in a reverse gear setting, a friction clutch and a fluid clutch interposed between the internal-combustion engine and the friction clutch; means operated by the physical effort of the driver for operating the friction clutch, manually operated means for establishing the transmission either in its reverse gear setting or in a forward gear setting, power means for operating the transmission to establish the same in certain of its forward gear settings, and means for controlling the operation of said power means including a plurality of controls comprising an accelerator operated switch operative, together with certain of said controls, to effect an up-shift operation of the transmission operating power means when the accelerator is released and further including a governor operated switch operative, together with certain of said controls, to effect a down-shift operation of the transmission operating power means when the vehicle is travelling below a certain speed.

7. In an automotive vehicle provided with a steering wheel and a power plant including an internal-combustion engine, a manually operable friction clutch, a manually and power operated change-speed transmission which may be established in a plurality of different settings, a fluid coupling interposed in the connection between the engine and clutch and cooperating with said clutch to effect a smooth start of the vehicle from rest and a smooth coupling of the internal combustion engine with the transmission after the transmission has been operated when the vehicle is in motion, and a manually operable accelerator for in part controlling the operation of the internal-combustion engine, the fluid coupling, and the change-speed transmission, means for operating the transmission preliminary to starting the vehicle in motion or to change the driving ratio between the engine and propeller shaft after the vehicle is in motion and operative only after the torque of the engine has been reversed by substantially reducing its speed, said means including a manually operated selector lever mounted adjacent the steering wheel, force transmitting means connecting said lever with the transmission and manually operable by the selector lever to selectively place the transmission in a reverse gear setting or in a relatively low gear forward speed setting or to prepare the transmission for an operation by power, power means, force transmitting means connecting the power means with the transmission, said power means including a motor having a power element therein subjectable to differentials of pressure, valve means for controlling the operation of said motor by controlling the gaseous pressure within said motor, means for operating said valve means comprising yieldable means and electromagnetic means and means for controlling the operation of said valve operating means including a vehicle speed responsive governor, a switch operated by said governor and wired to said electromagnetic means, the parts of said aforementioned mechanism being so constructed and arranged as to effect either the aforementioned reverse gear or relatively low gear forward speed settings of the transmission by disengaging the clutch and moving the selector lever to one or the other of two positions and to make possible a power operation of the transmission by moving the selector lever to a certain position, the power operation being then effective to automatically establish the transmission in a relatively low gear ratio setting when the speed of the vehicle is reduced sufficiently to effect an operation of the governor operated switch and to automatically establish the transmission in a relatively high gear ratio setting when the speed of the vehicle is increased sufficiently to again effect an operation of the governor operated switch.

8. In an automotive vehicle provided with a power plant including an internal combustion engine, an accelerator for in part controlling the operation of said engine and other mechanisms of the power plant, a change-speed transmission having a plurality of forward speed settings and a reverse gear setting, a friction clutch positioned between the transmission and engine and a clutch pedal for operating said clutch, a fluid coupling positioned between the friction clutch and engine said coupling cooperating with the friction clutch to effect a smooth start of the vehicle from rest, means for operating the transmission after and only after the internal combustion engine has been conditioned to reverse the driving torque thereof, that is substantially disable the engine as a prime mover to propel the vehicle, said transmission operating means including transmission operating force transmitting means extending from the casing of the transmission, a manually operated transmission operating and controlling selector member conveniently mounted for operation by the driver within the driver's compartment, force transmitting means interconnecting said selector with a portion of the aforementioned force transmitting means and movable by the selector to establish the transmission in its reverse gear setting and also movable to so actuate the aforementioned transmission operating force transmitting means as to prepare the transmission for its operation by power means, a motor operably connected with a portion of the force transmitting means extending from the transmission casing, said motor including a power element subjectable to differentials of pressure, valve means for controlling the operation of said motor by controlling the gaseous pressure within said motor, means for operating said valve means comprising yieldable means and electromagnetic means and means for controlling the operation of said valve operating means including a vehicle speed responsive governor, a switch operated by said governor and wired to said electromagnetic means, the parts of said aforementioned mechanism being so constructed and arranged as to effect a reverse gear setting of the transmission by the physical effort of the driver and effect by said motor, a power operation of the transmission after the selector has been moved to a certain position said power operation being effective to automatically establish the transmission in a relatively high gear ratio setting when the speed of the vehicle is increased sufficiently to effect an operation of the aforementioned governor operated switch and when the accelerator is released to reverse the engine torque by substantially reducing the speed of the engine.

9. In an automotive vehicle provided with a steering wheel and a power plant including an internal combustion engine, a manually operable friction clutch, a manually and power operated change-speed transmission, a fluid coupling interposed in the connection between the engine and friction clutch and cooperating with said clutch to effect a smooth start of the vehicle from rest and a smooth coupling of the internal combustion engine with the transmission after the latter has been operated when the vehicle is in motion, and a manually operable accelerator for in part controlling the operation of the internal combustion engine and the change-speed transmission, means for operating the transmission to start the vehicle in motion or after the vehicle is in motion and after the torque of the engine has been reversed by substantially reducing its speed, said means including a manually operated selector lever mounted adjacent the steering wheel, force transmitting means connecting said lever with the transmission and manually operable by the selector lever to selectively place the transmission in a reverse gear setting, in a relatively low gear forward speed setting or to prepare the transmission for its operation by power, power means and force transmitting means connecting the power means with the transmission, said power means including a motor having a power element therein subjectable to differentials of pressure, valve means for controlling the operation of said motor by controlling the gaseous pressure within said motor, means for operating said valve means comprising yieldable means and electromagnetic means and means for controlling the operation of said valve operating means including a vehicle speed responsive governor, a switch operated by said governor and wired to said electromagnetic means, the parts of said aforementioned mechanism being so constructed and arranged as to effect either a reverse gear or a relatively low gear forward speed setting of the transmission by manually disengaging the clutch and moving the selector lever to one or the other of two positions and to effect a power operation of the transmission by moving the selector lever to a certain position the power operation being effective to automatically establish the transmission in a relatively low ratio gear setting when the speed of the vehicle is reduced sufficiently to effect an operation of the aforementioned governor operated switch and to automatically establish the transmission in a relatively high gear ratio setting when the accelerator is released to reduce the speed of the internal combustion engine and when the speed of the vehicle is sufficiently increased to effect another operation of the governor operated switch.

10. In an automotive vehicle provided with a power plant including an internal combustion engine, a manually and power operated change-speed transmission which may be established in a plurality of forward gear settings and a reverse gear setting, a manually and power operated friction clutch positioned between the transmission and engine and a fluid coupling positioned between the friction clutch and the engine, a pressure differential operated two-stage motor for operating the friction clutch, valve means for controlling the operation of said motor, means including electromagnetic means for operating said valve means, a pressure differential operated motor for operating the transmission to establish the same in some of its gear ratio settings, valve means for controlling the operation of said latter motor, means including electromagnetic means for operating said latter valve means, means for controlling the operation of both of the aforementioned valve operating means comprising an accelerator operated switch means electrically connected to the first mentioned electromagnetic means, a vehicle speed responsive governor and switch means operated by said governor, said latter means being electrically connected to both of said electromagnetic means, an accelerator for in part controlling the operation of the transmission operating motor, the clutch operating two-stage motor, the internal combustion engine and the fluid coupling through the intermediary of the internal combustion engine, the aforementioned mechanism being so constructed and arranged as to automatically effect a disengagement of the friction clutch by the clutch operating motor and effect a relatively low speed gear ratio setting of the transmission by the transmission operating motor when the accelerator is released to operate the switch means connected thereto and the speed of the vehicle is reduced sufficiently to operate the governor operated switch means and also so constructed and arranged as to effect a smooth coupling of the internal combustion engine and transmission by the cooperation of the two-stage clutch control motor and the fluid coupling.

11. In an automotive vehicle provided with a power plant including an internal combustion engine, a manually and power operated selective gear transmission, a manually and power operated friction clutch positioned between the engine and the transmission and a fluid coupling positioned between the friction clutch and engine, a manually operated clutch pedal for disengaging the clutch prior to cranking the engine, power means for operating the friction clutch, a manually operated transmission operating selector lever, power means for operating the transmission, an accelerator for in part controlling the operation of the internal-combustion engine, the fluid coupling, the clutch operating power means and the transmission operating power means, force transmitting means interconnecting the clutch pedal and friction clutch, force transmitting means interconnecting the selector lever and transmission and operative, when the selector lever is moved to one position, to establish the transmission in reverse gear by the physical effort of the driver and also operative when the selector lever is moved to another position to establish the transmission in one of its forward gear settings by the physical effort of the driver, said power means comprising a vacuum operated motor operatively connected to the clutch and a motor operatively connected to the transmission, valve means for controlling the operation of said motors, means including electromagnetic means for operating said valve means, and means for controlling the operation of said electromagnetic means including an accelerator operated switch means electrically connected to the clutch motor valve controlling electromagnetic means, a vehicle speed responsive governor and a governor operated switch means electrically connected to the first mentioned electromagnetic means, the parts of the aforementioned mechanism being so constructed and arranged that when the selector lever is moved to a certain position, the accelerator is released and the speed of the vehicle is below a predetermined factor, there is effected a disengagement of the clutch by the clutch operating motor and an operation of the transmission by its motor to establish the transmission in a relatively low gear ratio setting, said parts of the mechanism being also so constructed and arranged as to effect, when the accelerator is released and the speed of the vehicle is above the aforementioned factor, an operation of the transmission by its motor to establish the transmission in a relatively high gear ratio setting.

12. In an automotive vehicle provided with a steering wheel, and a power plant including an internal combustion engine, a selective gear transmission, a friction clutch interposed in the power plant between the transmission and engine, a fluid coupling interposed in the power plant between the engine and friction clutch and an accelerator for in part controlling the operation of the internal combustion engine, the two clutches and the transmission, a manually operated selector lever mounted adjacent the steering wheel, force transmitting means interconnecting the lever with the transmission and operable when the selector is moved to one of its positions to establish the transmission in its reverse gear setting and operable when the selector is placed in another position to prepare the transmission for its operation by power, power means for in part operating both the friction clutch and the transmission, said power means including a motor operably connected to the clutch, a motor operably connected to the transmission, valve mechanism for controlling the operation of said motors including valve means for controlling the clutch operating motor and valve means for controlling the transmission operating motor, means for actuating said valve means comprising electromagnetic means, part of said latter means serving to operate a part of the valve means of the clutch operating motor and another part of said electromagnetic means serving to operate the valve means of the transmission operating motor, and means for operating said electromagnetic means including a vehicle speed responsive governor, a switch mechanism operated by said governor and electrically connected to said electromagnetic means, and accelerator operated switch means electrically connected to the governor operated switch and to the electromagnetic means and which operates the aforementioned valve means of the clutch operating motor.

13. In an automotive vehicle provided with an internal combustion engine, a throttle controlling accelerator, a transmission operating shift lever mounted adjacent the steering wheel of the vehicle, a friction clutch and a three-speeds forward and reverse change-speed transmission, power means for operating both the transmission and the clutch, said means including a pressure differential operated clutch operating motor, a three-way valve for in part controlling the operation of said motor, a solenoid for actuating said valve and a pressure differential operated motor operative only to establish the transmission in either a second gear setting or a high gear setting, valve means for in part controlling the operation of said last mentioned motor, solenoids for actuating said valve means, said power means further including electrical means for controlling the aforementioned solenoids, said electrical means comprising an accelerator operated switch wired to the aforementioned three-way valve operating solenoid, a governor operated switch wired to the aforementioned solenoids for actuating the valves of the transmission operating motor and operative to selectively condition the transmission motor controlling means to effect the two aforementioned forward gear settings, a transmission operating switch operative to in part control the operation of the clutch motor, a shift lever operated switch operative when the switch lever is in a certain position to make possible the operation of the transmission operating motor, and a switch operated by the clutch operating motor for in part controlling the operation of the transmission operating motor, the parts of the power means being so constructed and arranged as to effect, when the internal combustion engine is idling, a disengagement of the friction clutch by the friction clutch operating motor whenever the accelerator is released except when the transmission is in high gear and the vehicle is travelling at or above a predetermined speed and also to effect either a second or high gear operation of the transmission operating motor, depending upon the particular selective setting operation of the governor operated switch when the shift lever is in the aforementioned certain position and the accelerator is released to close the switch operated thereby.

14. In an automotive vehicle having a power plant including an internal combustion engine, a change-speed transmission, a friction clutch incorporated in the power plant between the transmission and engine and a fluid coupling incorporated in the power plant between the engine and friction clutch, power means, including a pressure differential operated motor for operating the transmission to establish the same in two of its forward speed settings, power means, including a pressure differential operated motor, for operating the friction clutch, a clutch pedal for at times operating the friction clutch, and means for manually operating the transmission to establish the same in its reverse gear setting and one of its forward speed settings and for controlling the operation of the engine, the fluid coupling, and both of the power means for operating the transmission and clutch, said means comprising an accelerator, a manually operated selector lever, a vehicle speed responsive governor and valve means for effecting a two stage clutch engaging operation of the clutch operating motor, the parts of the aforementioned mechanism being so constructed and arranged and so operable as to effect a two-stage clutch engaging operation of the clutch operating motor after the transmission has been established in the aforementioned forward speed setting, said operation of the clutch operating motor cooperating with the fluid coupling to effect a smooth start of the vehicle from rest and further operable, after the vehicle is under way, to effect an automatic operation of the transmission to establish the same in one or the other of the aforementioned two forward speed settings.

15. In an automotive vehicle provided with a power plant including an internal combustion engine having an intake manifold, a change-speed transmission, a friction clutch positioned between the transmission and engine, a fluid coupling positioned between the friction clutch and the engine and operative to facilitate a smooth start of the vehicle when the transmission is established in a predetermined gear ratio setting and an accelerator for in part controlling the operation of the engine, the fluid coupling and the transmission means cooperating with the fluid coupling and the friction clutch for effecting an operation of the transmission comprising a manually operable selector lever movable to a certain position to make possible a power operation of the transmission and so connected to the transmission that when said lever is moved to another one of its positions the transmission is established in its reverse gear setting, power means for establishing the transmission in some of its settings, said power means comprising a motor connected to the intake manifold of the internal combustion engine by conduit means, the power element of said motor being subjectable to differentials of fluid pressure, valve means for controlling the operation of said motor, means for actuating said valve means including electromagnetic means, and means cooperating with the operation of the accelerator in its control of the engine and fluid coupling, and so controlling the operation of said valve actuating means as to effect either an up-shift or a down-shift operation of the motor, said last named means also including a vehicle speed responsive governor operated switch means wired to the electromagnetic means, the parts of the aforementioned mechanism being so constructed and arranged as to effect an up-shift operation of the transmission by said motor when the governor operated switch is operated and the gaseous pressure within the intake manifold and transmission operating motor is substantially reduced by releasing the accelerator.

THOMAS L. MAYRATH.

REFERENCES CITED

The following references are of record in the file of this patent:

UNITED STATES PATENTS

| Number | Name | Date |
|---|---|---|
| 1,911,599 | Bloxsom | May 30, 1933 |
| 2,000,331 | Hill | May 7, 1935 |
| 2,182,407 | Phelan et al. | Dec. 5, 1939 |
| 2,237,944 | Maurer | Apr. 8, 1941 |
| 2,261,898 | Barkeij | Nov. 4, 1941 |
| 2,267,464 | Iavelli | Dec. 23, 1941 |
| 2,296,290 | Mayrath | Sept. 22, 1942 |